(12) United States Patent
Lanier

(10) Patent No.: US 6,394,326 B1
(45) Date of Patent: May 28, 2002

(54) BICYCLE RACK FOR TRUCKS

(76) Inventor: Gene A. Lanier, 25623 New York, Dearborn Heights, MI (US) 48125

( * ) Notice: Subject to any disclaimer, the term of this patent is extended or adjusted under 35 U.S.C. 154(b) by 0 days.

(21) Appl. No.: 09/709,272

(22) Filed: Nov. 10, 2000

(51) Int. Cl.[7] ................................................ B60R 7/00
(52) U.S. Cl. ........................ 224/405; 224/551; 224/924; 296/3; 296/43; 414/462
(58) Field of Search .................................. 224/403, 405, 224/547, 551, 924; 296/3, 43; 414/462; 211/182

(56) References Cited

U.S. PATENT DOCUMENTS

| | | |
|---|---|---|
| D36,091 S | 9/1902 | Merritt |
| 3,912,139 A | 10/1975 | Bowman |
| 4,138,046 A * | 2/1979 | De Freze ................ 224/403 X |
| 4,236,854 A * | 12/1980 | Rogers ........................ 410/121 |
| 5,092,504 A | 3/1992 | Hannes et al. |
| 5,303,858 A | 4/1994 | Price |
| 5,516,020 A | 5/1996 | Lawler et al. |
| 5,553,762 A * | 9/1996 | Brown ........................ 224/403 |
| 5,611,472 A | 3/1997 | Miller |
| 5,699,945 A * | 12/1997 | Micklish ...................... 224/402 |
| 5,836,490 A * | 11/1998 | Price ............................ 224/403 |
| 6,179,181 B1 * | 1/2001 | Johnson et al. ............. 224/405 |

* cited by examiner

*Primary Examiner*—Stephen K. Cronin

(57) ABSTRACT

A bicycle rack for trucks for elevating the bicycles above the truck bed so that cargo can still be carried upon the truck bed. The bicycle rack for trucks includes rack support assembly being adapted to be mounted upon walls of a truck box; and also includes a rack assembly including rack members being adjustably mounted to the rack support assembly.

9 Claims, 3 Drawing Sheets

BICYCLE RACK FOR TRUCKS

BACKGROUND OF THE INVENTION

1. Field of the Invention

The present invention relates to a bike rack for sports trucks and more particularly pertains to a new bicycle rack for trucks for elevating the bicycles above the truck bed so that cargo can still be carried upon the truck bed.

2. Description of the Prior Art

The use of a bike rack for sports trucks is known in the prior art. More specifically, a bike rack for sports trucks heretofore devised and utilized are known to consist basically of familiar, expected and obvious structural configurations. notwithstanding the myriad of designs encompassed by the crowded prior art which have been developed for the fulfillment of countless objectives and requirements.

Known prior art includes U.S. Pat. No. 5,611,472; U.S. Pat. No. 3,912,139; U.S. Pat. No. 5,092,504; U.S. Pat. No. 5,516,020; U.S. Pat. No. 5,303,858; and U.S. Pat. No. Des. 36,091.

While these devices fulfill their respective, particular objectives and requirements, the aforementioned patents do not disclose a new bicycle rack for trucks. The inventive device includes rack support assembly being adapted to be mounted upon walls of a truck box; and also includes a rack assembly including rack members being adjustably mounted to the rack support assembly.

In these respects, the bicycle rack for trucks according to the present invention substantially departs from the conventional concepts and designs of the prior art, and in so doing provides an apparatus primarily developed for the purpose of elevating the bicycles above the truck bed so that cargo can still be carried upon the truck bed.

SUMMARY OF THE INVENTION

In view of the foregoing disadvantages inherent in the known types of bike rack for sports trucks now present in the prior art, the present invention provides a new bicycle rack for trucks construction wherein the same can be utilized for elevating the bicycles above the truck bed so that cargo can still be carried upon the truck bed.

The general purpose of the present invention, which will be described subsequently in greater detail, is to provide a new bicycle rack for trucks which has many of the advantages of the bike rack for sports trucks mentioned heretofore and many novel features that result in a new bicycle rack for trucks which is not anticipated, rendered obvious, suggested, or even implied by any of the prior art bike rack for sports trucks, either alone or in any combination thereof.

To attain this, the present invention generally comprises rack support assembly being adapted to be mounted upon walls of a truck box; and also includes a rack assembly including rack members being adjustably mounted to the rack support assembly.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new bicycle rack for trucks which has many of the advantages of the bike rack for sports trucks mentioned heretofore and many novel features that result in a new bicycle rack for trucks which is not anticipated, rendered obvious, suggested, or even implied by any of the prior art bike rack for sports trucks, either alone or in any combination thereof.

It is another object of the present invention to provide a new bicycle rack for trucks which may be easily and efficiently manufactured and marketed.

It is a further object of the present invention to provide a new bicycle rack for trucks which is of a durable and reliable construction.

An even further object of the present invention is to provide a new bicycle rack for trucks which is susceptible of a low cost of manufacture with regard to both materials and labor, and which accordingly is then susceptible of low prices of sale to the consuming public, thereby making such bicycle rack for trucks economically available to the buying public.

Still yet another object of the present invention is to provide a new bicycle rack for trucks which provides in the apparatuses and methods of the prior art some of the advantages thereof, while simultaneously overcoming some of the disadvantages normally associated therewith.

Still another object of the present invention is to provide a new bicycle rack for trucks for elevating the bicycles above the truck bed so that cargo can still be carried upon the truck bed.

Yet another object of the present invention is to provide a new bicycle rack for trucks which includes rack support assembly being adapted to be mounted upon walls of a truck box; and also includes a rack assembly including rack members being adjustably mounted to the rack support assembly.

Still yet another object of the present invention is to provide a new bicycle rack for trucks that can be easily and quickly mounted upon the walls of the truck box.

Even still another object of the present invention is to provide a new bicycle rack for trucks that allows other belongings to be transported without bicycle interference.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
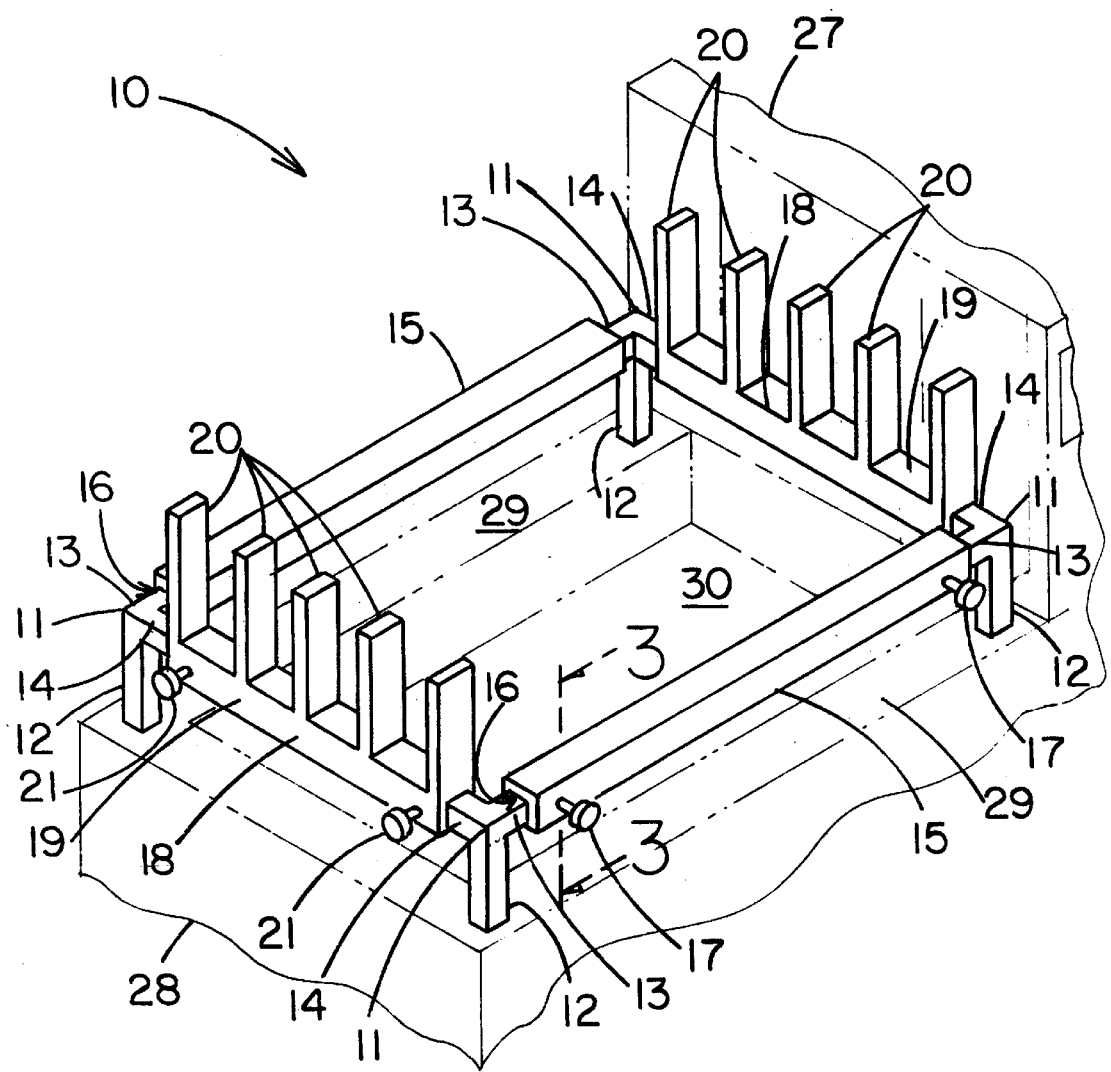
FIG. 1 is a perspective view of a new bicycle rack for trucks according to the present invention.
Figure 2:
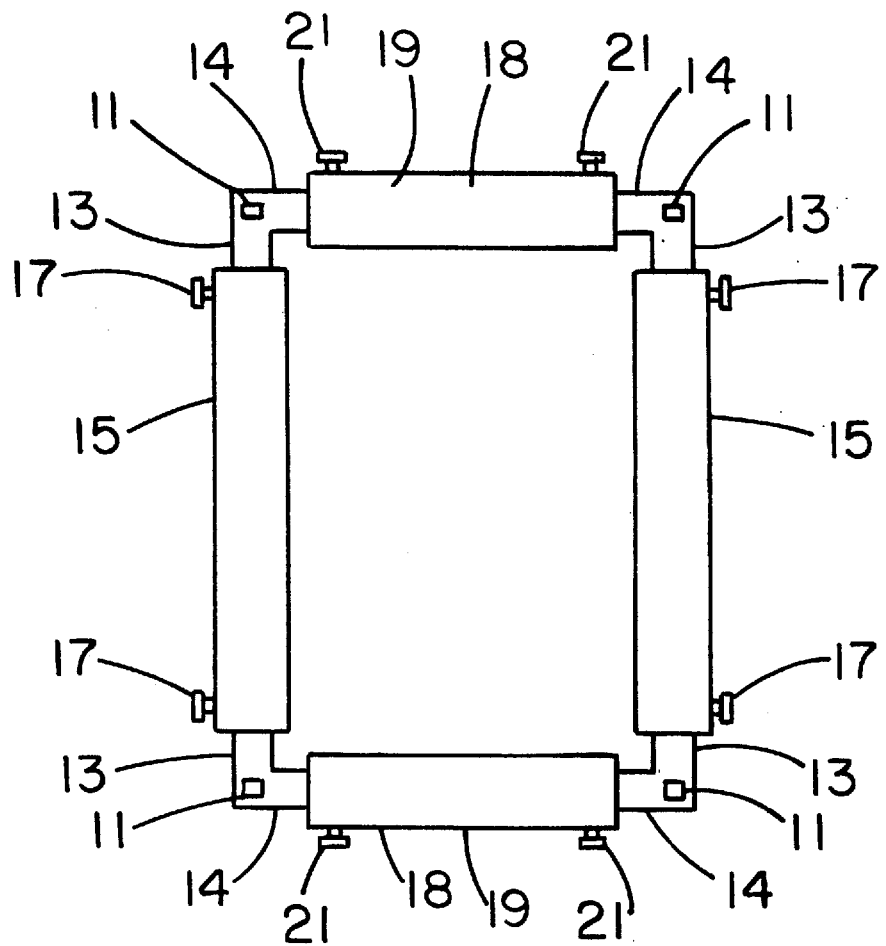
FIG. 2 is a bottom plan view of the present invention.
Figure 3:
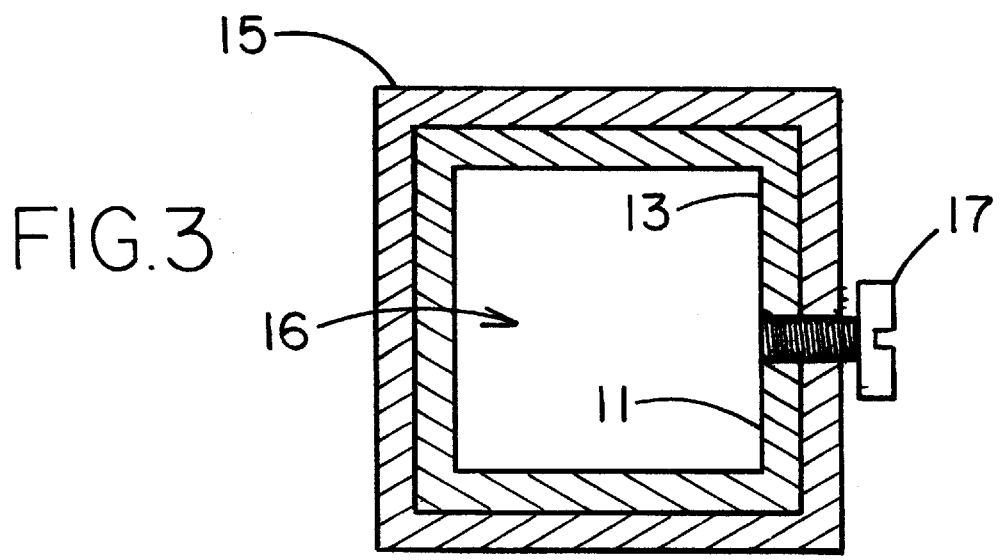
FIG. 3 is a partial cross-sectional view of the present invention.
Figure 4:
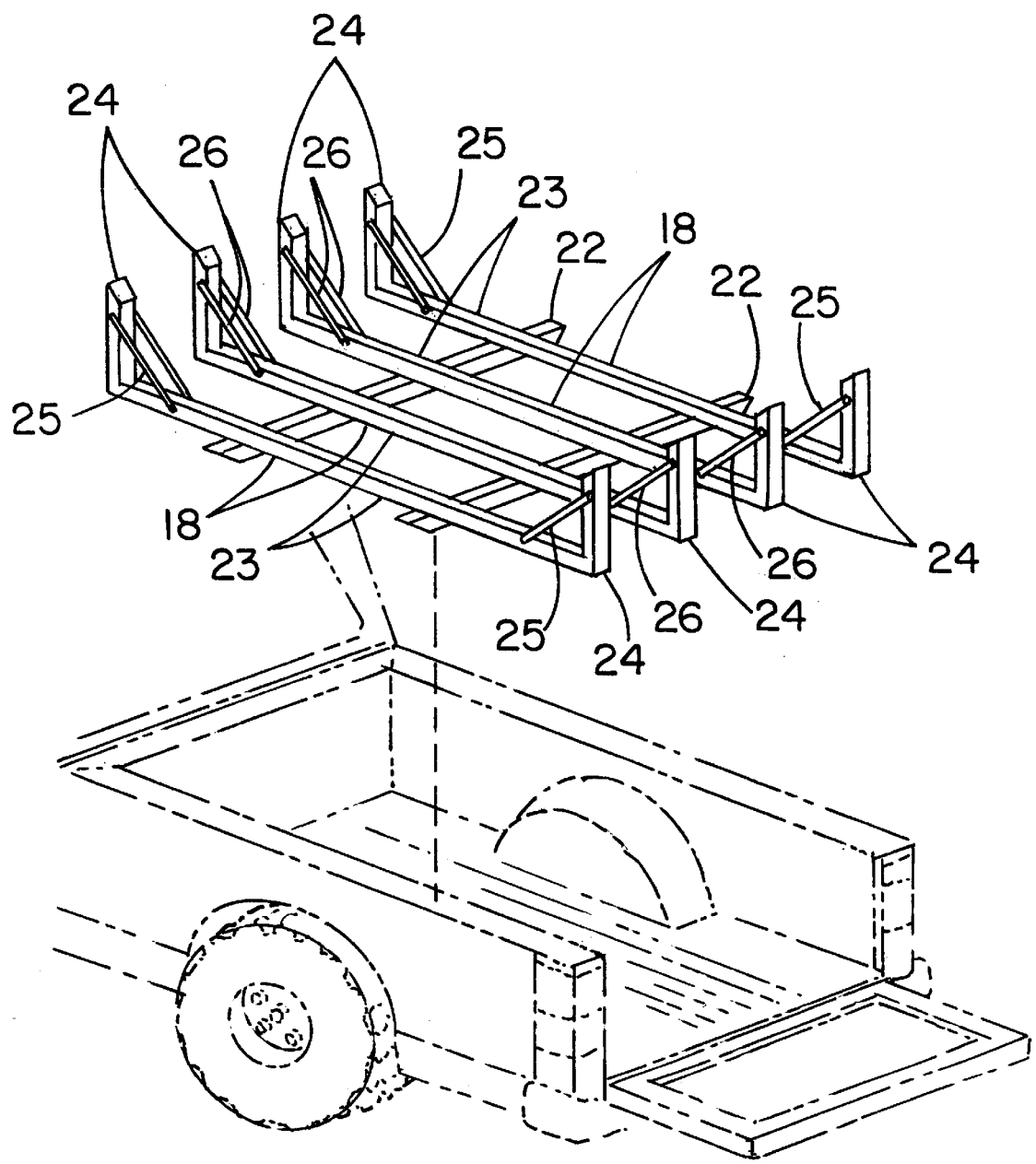
FIG. 4 is a perspective view of a second embodiment of the present invention.

With reference now to the drawings, and in particular to FIGS. 1 through 4 thereof, a new bicycle rack for trucks embodying the principles and concepts of the present invention and generally designated by the reference numeral 10 will be described.

As best illustrated in FIGS. 1 through 4, the bicycle rack for trucks 10 generally comprises a rack support assembly being adapted to be mounted upon walls 29 of a truck box 28. The rack support assembly includes corner base members 11 with each having a leg portion 12 and first and second arm portions 13, 14 integrally extending outwardly of the leg portion 12 and being angled relative to one another. The rack support assembly further includes elongate tubular members 15 having open ends 16 which are adapted to receive the first arm portions 13 of the corner base members 11. The elongate tubular members 15 are disposed along and above side walls 29 of the truck box 28. The rack support assembly also includes fastening members 17 being threaded through walls of the elongate tubular members 15 and being engagable to the first arm portions 13 of the corner base members 11 for fastening the corner base members 11 to the elongate tubular members 15.

A rack assembly includes rack members 18 being adjustably mounted to the rack support assembly. Each of the rack members 18 including an elongate tubular base member 19 having open ends, and also includes tire support upright members 20 being spaced apart and being integrally disposed upon the elongate tubular base member 19 and being adapted to receive tires of bicycles therebetween. The open ends of the elongate tubular base members 19 are adapted to receive the second arm portions 14 of the corner base members 11. The rack assembly further includes fasteners 21 being threaded through walls of the elongate tubular base members 19 and being engagable to the second arm portions 14 of the corner base members 11.

As a second embodiment, the rack support assembly includes elongate base members 22 being adapted to be mounted upon side walls 29 of the truck box 28 and to extend between the side walls 29 of the truck box 28. The rack assembly includes rack members 18 being conventionally mounted to the rack support assembly. Each of the rack members 18 including an elongate main portion 23 and end portions 24 which are angled upwardly relative to the elongate main portion 23 with the elongate main portion being securely and conventionally mounted upon the elongate base members 22. The rack assembly further includes bracket members 25 having ends which are attached to the end portions 24 and to the elongate main portions 23 of the rack members 18. Each of the bracket members 25 includes a pair of bars 26 being spaced apart and being angled relative to a respective end portion 24 and main portion 23. Each pair of bars 26 is adapted to receive a bicycle tire therebetween.

In use, the user mounts the bicycle rack 10 upon the truck box 28 of a truck 27 so that the bicycles would be elevated above the truck bed 30 so that the user can also carry other items upon the truck bed 30 in addition to the bicycles.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A bicycle rack for trucks comprising:

a rack support assembly being adapted to be mounted upon walls of a truck box; and a rack assembly including rack members being adjustably mounted to said rack support assembly;

wherein said rack support assembly includes corner base members having a leg portion and first and second arm portions extending outwardly of said leg portion and being angled relative to one another.

2. A bicycle rack for trucks as described in claim 1, wherein each of said rack members includes an elongate tubular base member having open ends, and also includes tire support upright members being spaced apart and being disposed upon said elongate tubular base member and being adapted to receive tires of bicycles therebetween, said open ends of said elongate tubular base members being adapted to receive said second arm portions of said corner base members, said rack assembly further including fasteners being threaded through walls of said elongate tubular base members and being engagable to said second arm portions of said corner base members.

3. A bicycle rack for trucks as described in claim 1, wherein said rack support assembly further includes elongate tubular members having open ends which are adapted to receive said first arm portions of said corner base members, said elongate tubular members being disposed along and above side walls of the truck box.

4. A bicycle rack for trucks as described in claim 3, wherein said rack support assembly also includes fastening members being threaded through walls of said elongate tubular members and being engagable to said first arm portions of said corner base members for fastening said corner base members to said elongate tubular members.

5. A bicycle rack for trucks as described in claim 1, wherein said rack support assembly includes elongate base members being adapted to be mounted upon side walls of the truck box and to extend between the side walls of the truck box.

6. A bicycle rack for trucks as described in claim 5, wherein each of said rack members includes an elongate main portion and end portions which are angled upwardly relative to said elongate main portion with said main portion being securely mounted upon said elongate base members.

7. A bicycle rack for trucks as described in claim 6, wherein said rack assembly further includes bracket members having ends which are attached to said end portions and to said elongate main portions of said rack members, each of said bracket members including a pair of bars being spaced apart and being angled relative to a respective said end portion and said main portion, each pair of bars being adapted to receive a bicycle tire therebetween.

8. A bicycle rack for trucks comprising:

a rack support assembly being adapted to be mounted upon walls of a truck box, said rack support assembly including corner base members having a leg portion and first and second arm portions extending outwardly of said leg portion and being angled relative to one another, said rack support assembly further including elongate tubular members having open ends which are adapted to receive said first arm portions of said corner base members, said elongate tubular members being disposed along and above side walls of the truck box, said rack support assembly also including fastening members being threaded through walls of said elongate tubular members and being engagable to said first arm portions of said corner base members for fastening said corner base members to said elongate tubular members; and a rack assembly including rack members being adjustably mounted to said rack support assembly, each of said rack members including an elongate tubular base member having open ends, and also including tire support upright members being spaced apart and being disposed upon said elongate tubular base member and being adapted to receive tires of bicycles therebetween, said open ends of said elongate tubular base members being adapted to receive said second arm portions of said corner base members, said rack assembly further including fasteners being threaded through walls of said elongate tubular base members and being engagable to said second arm portions of said corner base members.

9. A bicycle rack for trucks comprising:

a rack support assembly being adapted to be mounted upon walls of a truck box, said rack support assembly including elongate base members being adapted to be mounted upon side walls of the truck box and to extend between the side walls of the truck box; and a rack assembly including rack members being adjustably mounted to said rack support assembly, each of said rack members including an elongate main portion and end portions which are angled upwardly relative to said elongate main portion with said elongate main portion being securely mounted upon said elongate base members, said rack assembly further including bracket members having ends which are attached to said end portions and to said elongate main portions of said rack members, each of said bracket members including a pair of bars being spaced apart and being angled relative to a respective said end portion and said main portion, each pair of bars being adapted to receive a bicycle tire therebetween.

* * * * *